United States Patent [19]
Putt

[11] 4,249,115
[45] Feb. 3, 1981

[54] MAGNETIC APPARATUS FOR PRODUCING MOVEMENT

[76] Inventor: J. William Putt, 1162M S. Cedar Crest Blvd., Allentown, Pa. 18103

[21] Appl. No.: 951,710

[22] Filed: Oct. 16, 1978

Related U.S. Application Data

[63] Continuation-in-part of Ser. No. 758,227, Jan. 10, 1977, Pat. No. 4,121,139, which is a continuation-in-part of Ser. No. 634,568, Nov. 24, 1975.

[51] Int. Cl.³ .............................................. H02K 33/16
[52] U.S. Cl. ..................................... 318/134; 310/34
[58] Field of Search .................... 310/34, 35; 318/134; 335/267, 268

[56] References Cited
U.S. PATENT DOCUMENTS 4,121,139  10/1978  Putt ................................... 310/35 X

*Primary Examiner*—Donovan F. Duggan
*Attorney, Agent, or Firm*—Beveridge, DeGrandi, Kline & Lunsford

[57] ABSTRACT

A driven body is moved in opposite directions by alternately magnetizing two sets of paramagnetic bodies, each set being located between a drive magnet longitudinally affixed to the driven body and a stationary magnet toward which the magnetized bodies are attracted.

15 Claims, 3 Drawing Figures

MAGNETIC APPARATUS FOR PRODUCING MOVEMENT

REFERENCE TO RELATED APPLICATIONS

This is a continuation-in-part of my application Ser. No. 758,227 filed Jan. 10, 1977, which in turn was a continuation-in-part of application Ser. No. 634,568 filed Nov. 24, 1975. Application Ser. No. 758,227 issued as U.S. Pat. No. 4,121,139 on Oct. 17, 1978 and is incorporated herein by reference.

BACKGROUND AND SUMMARY

This invention relates to apparatus wherein two sets of paramagnetic members are alternately magnetized to produce bidirectional movement of a driven body. Devices of this broad general type are known as exemplified by the following U.S. Pat. Nos.:
Feldman—3,320,894
Perron—3,384,021
Waltrip—3,492,819
Tukamizawa—3,606,595
Kurpanek—3,878,412.

This invention is similar in many respects to the apparatus disclosed in U.S. Pat. No. 4,121,139, and is similar to the apparatus of Macy U.S. Pat. No. 3,488,614 in the respect that a plurality of spaced apart paramagnetic bodies are drawn together by magnetic attraction to close the gaps between them. The Macy device, however, is unidirectional and does not provide some energy-conserving features of the present invention.

According to the present invention, the forces of magnetic attraction are used to produce bidirectional movement, such movement being capable of exerting a substantial force over a substantial distance. The ratio of such force to the energy consumed is substantially greater than in a system which relies on both magnetic repulsion and magnetic attraction. The invention in its preferred embodiment is also more energy efficient because the magnets within a given set are energized sequentially rather than simultaneously; and, some of the magnets are deenergized after the adjacent gaps have been closed and before other gaps in the respective set have been closed. In the disclosed embodiment, no more than about 36% of the magnets are energized at any time.

According to the invention, the apparatus for producing movement of a driven body includes two sets of intermediate paramagnetic members which operate respectively to move the driven body in first and second directions. At least one stationary paramagnetic member and at least one driven paramagnetic member are arranged so that each said set has a driven member at one end and a stationary member at its opposite end. The driven member is connected to the driven body, and the intermediate members are movable from mutually proximate relative positions to mutually distant relative positions where they are separated by gaps. Means are provided for limiting the size of the gaps to prevent excessive separation between adjacent members. Energizing means are provided for alternately magnetizing the first set of members and the second set of members to close the gaps by magnetic attraction, thereby moving the driven body alternately in the first direction and the second direction.

Preferably, the driven member is a reciprocating shaft which extends through the members and lies parallel to a common longitudinal axis along which both sets of members are disposed. The members in a set are magnetized sequentially at spaced times and, to conserve energy, at least some of the members in a set are deactivated after their adjacent gaps have been closed and before other gaps in the respective set of members have been closed. A compression spring is located between a pair of the adjacent members for compression when the members are moved to their mutually proximate relative positions by magnetic force, whereby the members are forced apart when the magnets are deenergized. The apparatus is provided with stationary members located at both ends of each set, operable when the first set is magnetized for magnetically attracting the driven magnet of the second set to the stationary magnet adjacent thereto. Similar means operate in a reverse direction for attracting the driven member of the first set to a stationary magnet.

For a further understanding of the invention, reference is hereby made to the accompanying drawings and description of a preferred embodiment.

THE DRAWINGS

DESCRIPTION OF A PREFERRED EMBODIMENT

Figure 1:
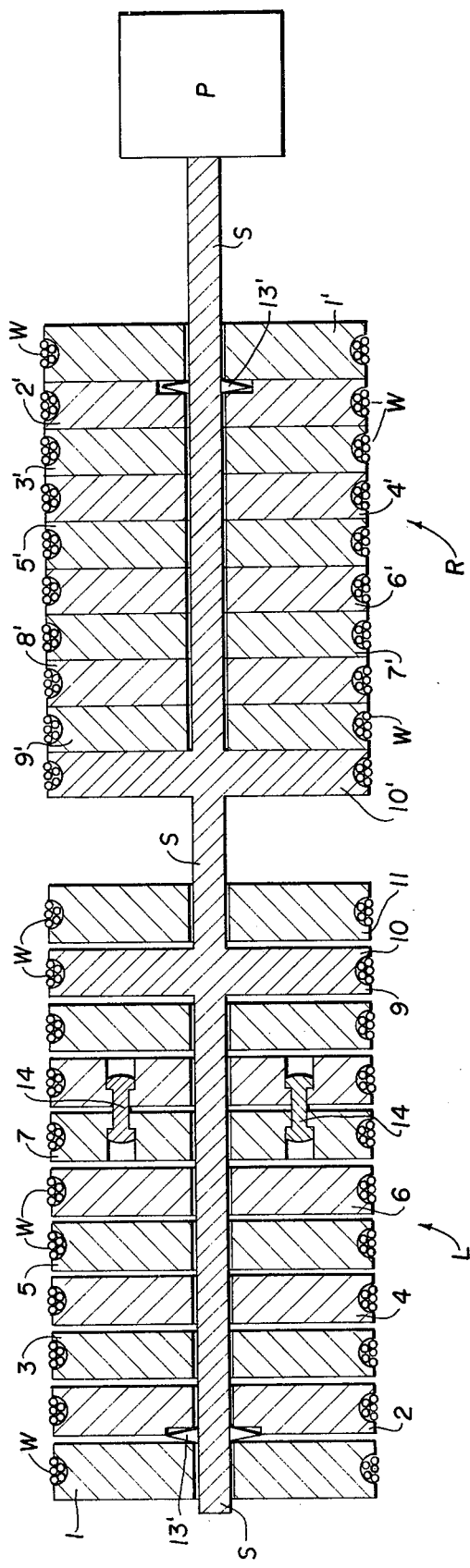
FIG. 1 is a diagrammatic elevational view of an apparatus constructed according to the invention.

FIG. 1 shows a reciprocating pump P connected to a reciprocating shaft S which is driven by the apparatus of this invention.

The driving means includes a set of three stationary magnets 1, 11 and 1' which slidably support the shaft S and are spaced apart at equal intervals along the shaft axis. A pair of drive magnets 10 and 10' are affixed to the shaft S to form an armature assembly. This armature assembly is driven in a reciprocating fashion by two sets of magnets generally designated L and R. The left set L is energized to drive the shaft to the left by magnetic attraction, and the right set R operates to drive the shaft to the right.

The left set L of magnets includes a set of intermediate magnets 2–9 slidably supported on shaft S between the stationary magnet 1 and the drive magnet 10. Similarly, the second set of magnets R includes intermediate magnets 2'–9' slidable on the shaft S between the stationary end magnet 1' and the driven magnet 10'.

When the shaft S is at its rightmost position as shown in FIG. 1, the magnets in set L are in mutually distant relative positions, separated from each other by air gaps as illustrated; and, the magnets in set R are in contact with each other, assuming mutually proximate relative positions. When shaft S is at its leftmost limit of travel, the magnets in set L will lie against each other, no longer separated by gaps; and, the magnets in set R will be spaced apart, separated by gaps. The magnet 10' will then lie in contact with the stationary magnet 11.

When one set of magnets is energized and magnetically drawn together toward a stationary magnet, the other set is pulled apart by movement of the shaft which moves its respective drive magnet 10 or 10'. It is important that the magnets when pulled apart are not separated by excessive air gaps which would prevent them from being drawn together by magnetic attraction. In order to limit the air gap size and prevent excessive separation between adjacent magnets, each intermediate magnet is connected to its adjacent intermediate magnet by double-headed retainer pins such as the exemplary ones shown at 14 in FIG. 1. These pins are axially slidable in the magnets to permit the adjacent magnets to move together and apart, but the latter movement is terminated when the heads of pins 14 strike the bottoms of the respective counterbores, at which time the air gap has the desired thickness. If the air gaps closest to an attracting stationary magnet are closed first, these pins 14 will mechanically pull the associated drive magnet in the desired direction.

Each of the magnets includes an annular body of paramagnetic material, preferably a ferrous metal, and windings W which encircle the body and lie in a peripheral groove.

This magnet configuration is shown to simplify this description, but it is mentioned here that magnets of the type illustrated in FIGS. 9 and 12–14 of my aforementioned U.S. Pat. No. 4,121,139 are preferred. The windings of sets L and R are energized alternately by passing an electrical current therethrough. This magnetizes the energized set, closing the gaps between the magnets by magnetic attraction and moving the shaft in one direction. When the magnets in one set are deenergized and the opposite set is energized, the shaft will move in the opposite direction. The resulting reciprocating motion is delivered by the shaft S to a pump P, propulsion wheel, electric generator or any other output device.

Compression springs 13 and 13' are on the shaft S, respectively between the magnets 1 and 2 and between the magnets 1' and 2'. These may be helical compression springs or sets of spring washers such as the well-known Belleville springs. Their function is to become compressed during the final stage of movement in one direction, thereby storing energy which is released to force the magnets apart when deenergized, commencing the oppositely-directed movement of the system.

While it is possible to operate the device by simultaneously energizing all magnets in a set as described above, it is preferred that the magnets in a set and its associated drive and stationary magnets be energized in sequence, and deenergized when unneeded. The other set follows a similar timed sequence.

Figure 2:
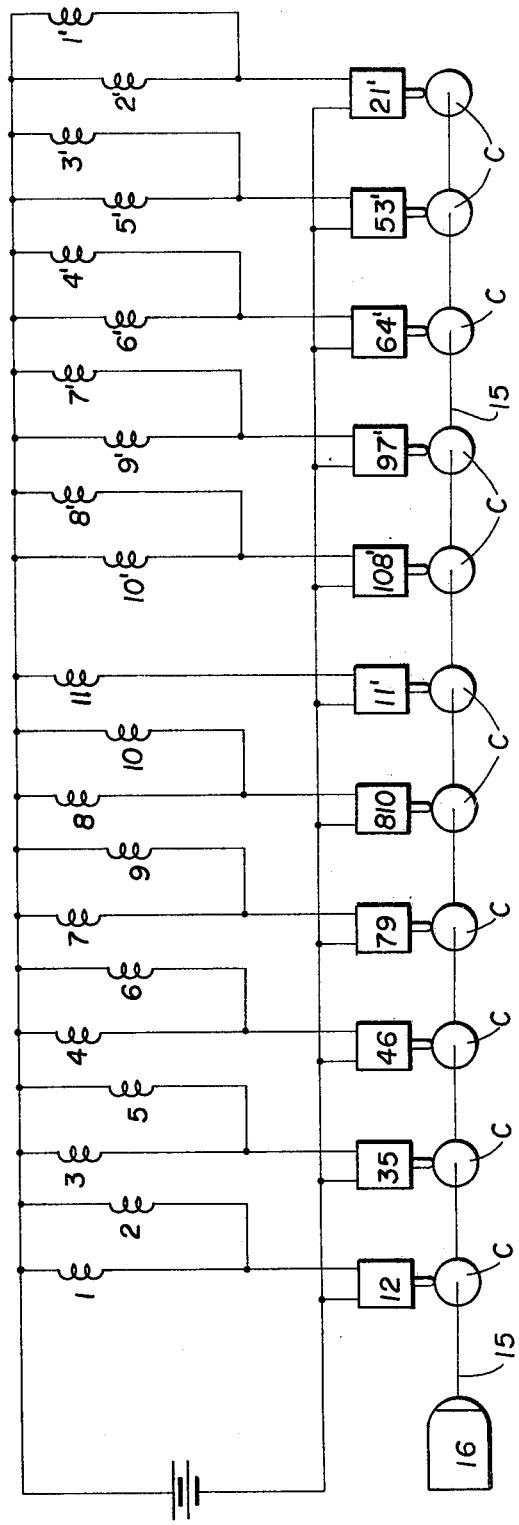
FIG. 2 is a schematic diagram of the energizing means for magnetizing the members of the apparatus.

Timed sequential energization of the magnets may be achieved by a variety of systems, one of which is illustrated diagramatically in FIG. 2, in which the magnet windings are identified by the reference numerals of their associated magnet. Switching circuits which connect the power supply 15 to the magnet windings are identified by reference numerals which are a composite of the reference numeral of the magnets controlled thereby, these switching circuits being designated from left to right as 12, 35, 46, 79, 810, 108', 11', 97', 64', 53' and 21'. These switching circuits are changed from their non-conducting to their conducting conditions by a set of timing cams C, all of which are affixed to a common shaft 15 driven by a timing motor 16 rotating at a constant speed which is adjustable. The switching circuits may be simple relays and solenoid-actuated switches, or they may be any of the well-known electrical controls known in the art and marketed under the names Triac by International Rectifier, Power Darlington by Motorola or gate turnoff SCR (GTO) by RCA.

Figure 3:
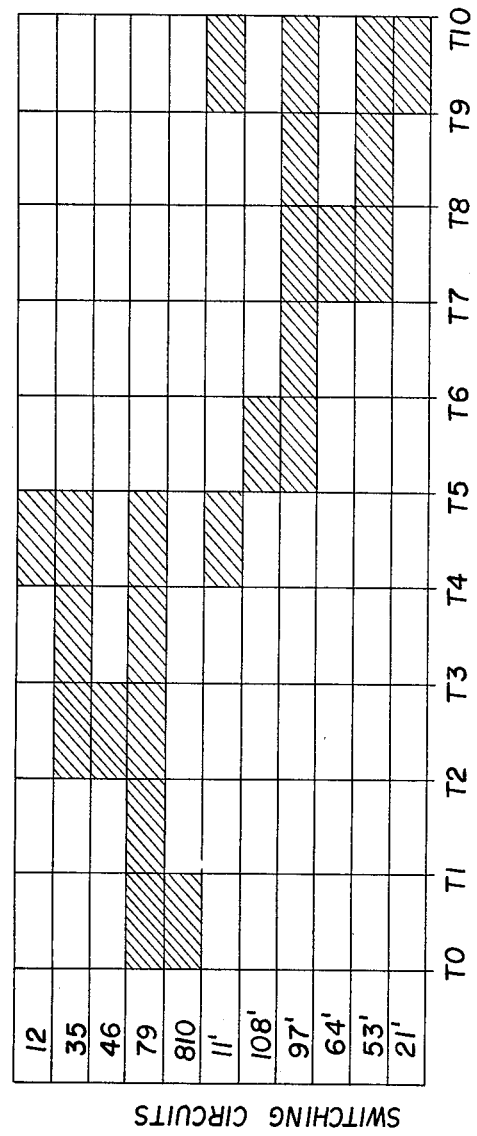
FIG. 3 is a timing diagram showing the preferred sequence of magnetization.

The cams C have high and low portions which engage followers in the associated switching circuits, preferably producing the timing sequence shown in FIG. 3.

This timing sequence begins with the apparatus in the position shown in FIG. 1.

Preferably, the first gap or gaps to close are those furthest from the stationary magnet toward which the energized magnets are moving. This minimizes the mass which must be moved by magnetic attraction during the initial stages of acceleration in each direction. To commence the cycle, switches 79 and 810 are closed at T0 to move the magnets 7, 8, 9 and 10 together, thereby moving the magnet 10 and shaft S to the left a distance equal to the thickness of three air gaps. At or shortly before the conclusion of this movement, switch 810 is opened at T1 to deenergize magnets 8 and 10. This conserves energy since magnets 7 and 9 are capable of keeping the gaps closed between the magnets 7, 8, 9 and 10. Next, at time T2, switches 35 and 46 are closed, energizing the magnets 3, 4, 5 and 6, closing the air gaps between them and the air gaps between magnets 6 and 7. This moves the drive magnet 10 and shaft S to the left a distance equal to the thickness of four air gaps. At time T3, switch 46 is opened as magnets 4 and 6 are no longer needed to maintain their associated air gaps in a closed condition. At time T4, switch 12 is closed, causing the magnets 1 and 2 to become energized to close the gaps which exist between the magnets 1, 2 and 3. Switch 11' is also closed to attract the magnet 10' of set R to the left. The shaft S moves to the left a distance equal to the thickness of two air gaps. As this movement occurs, the spring 13 is compressed to store energy which is subsequently releasable to initiate the rightward movement of the shaft S.

Before the shaft S moves to the right, the switching circuits are opened to deenergize all of the magnets 1–10. This releases the energy of spring 13, moving the magnets 2–10 and shaft S to the right. At or about the same time, the set R of magnets commences its operative cycle to move the drive magnet 10' and shaft S to the right. This cycle is essentially a mirror image of the cycle undergone by set L of magnets. At T5, switches 97' and 108' are closed to attract magnets 7', 8', 9' and 10' together and close the air gaps which lie between them. This moves the magnet 10' and shaft S to the right a three gap distance. At T6, switch 108' is opened to deenergize its respective magnets which are not needed to hold the magnets together. At T7, switches 64' and 53' are closed to close the gaps between the magnets 3'–7' and move the drive magnet 10' and shaft S to the right an additional distance equal to the thickness of four air gaps. Switch 64' is opened at T8; and, at T9, switch 21' is closed to produce the closing of the air gaps between the magnets 1'–3'. The central stationary magnet 11 is also energized at T9 to attract the magnet 10 of set L to the right. During this final rightward movement, spring 13' is compressed to store energy which is released when all magnets in set R are deenergized at T10. Simultaneously with or shortly after such deenergization, the next cycle is started as indicated at T0.

Suitable timing intervals are determined experimentally for any given installation to provide for relatively smooth and uninterrupted movement in both directions. In an appropriate arrangement starting at T0, T1 occurs at 0.05 second, T2 at 0.075 second, T3 at 0.15 second, T4 at 0.175 second and T5 at 0.25 second.

Rather than using constant speed timing cams, magnet energization may be controlled by switches which open and close in response to the position or movement of the shaft or magnets, such switches having actuators appropriately positioned in the paths of the moving elements.

The invention may take many forms which differ from the illustrated embodiment. For example, there may be a single stationary magnet, two drive magnets connected to the drive shaft, and two sets of intermediate magnets located between the stationary magnet and their respective drive magnets; or, the central stationary magnet may be omitted to permit a single drive magnet on the drive shaft to be attracted alternately to the left and right by the intermediate magnets.

Some of the magnets may be replaced by passive bodies of paramagnetic material; and, it is possible but undesirable to place thin bodies of diamagnetic material between adjacent magnets. To reduce the kinematic effect when the moving members change direction, two oppositely-acting apparatuses may be supported on a single mounting frame, laterally or longitudinally displaced from each other.

In view of the many potential forms which the invention may take, it is emphasized that the invention is not limited only to the preferred embodiment and modifications thereto mentioned above. Rather, the invention is embracing of a diverse number of systems falling within the spirit of the following claims.

I claim:

1. Apparatus for producing movement of a driven body, comprising,
   a first set of intermediate paramagnetic members for producing movement of the driven body in a first direction,
   a second set of intermediate paramagnetic members for producing movement of the driven body in a second direction which is opposite to said first direction,
   at least one stationary paramagnetic member, at least one driven paramagnetic member connected to the driven body, said driven and stationary members being disposed where each said set of intermediate members has a driven member at one end thereof and a stationary member at the opposite end thereof,
   said intermediate members being aligned with their respective driven member and being movable from mutually proximate relative positions to mutually distant relative positions where they are separated by gaps, means for limiting the size of said gaps to prevent excessive separation between adjacent members, and
   energizing means for alternately magnetizing said first set of members and said second set of members to close the gaps by magnetic attraction and move the driven body alternately in said first direction and said second direction.

2. The apparatus of claim 1 wherein the energizing means magnetizes the intermediate members in a set sequentially at spaced times.

3. The apparatus of claim 2 wherein the energizing means, to conserve energy, deactivates at least some of the members in a set after their respective gaps have been closed and before other gaps in their respective set of members have been closed.

4. The apparatus of claim 1 wherein both sets of members are aligned on a common longitudinal axis, said driven member being a reciprocating shaft which lies parallel to said axis and extends through said members.

5. The apparatus of claim 4 wherein the energizing means magnetizes the intermediate members in a set sequentially at spaced times.

6. The apparatus of claim 5 wherein the energizing means, to conserve energy, deactivates at least some of the members in a set after their respective gaps have been closed and before other gaps in their respective set of members have been closed.

7. The apparatus of claim 1 having a plurality of said stationary members, said stationary members being located at both ends of each set of members, means operable when the first set is magnetized for magnetically attracting the driven member associated with said second set to the stationary magnet adjacent thereto, and means operable when the second set is magnetized for magnetically attracting the driven member associated with said first set to the stationary magnet adjacent thereto.

8. The apparatus of claim 7 wherein both sets of members are aligned on a common longitudinal axis, said driven member being a reciprocating shaft which lies parallel to said axis and extends through said members.

9. The apparatus of claim 7 wherein the energizing means magnetizes the intermediate members in a set sequentially at spaced times.

10. The apparatus of claim 9 wherein the energizing means, to conserve energy, deactivates at least some of the members in a set after their respective gaps have been closed and before other gaps in their respective set of members have been closed.

11. The apparatus of claim 1 having a compression spring located between a pair of adjacent said members for compression when said members are magnetized to move to their mutually proximate relative positions, whereby said members are forced apart when they are deenergized.

12. The apparatus of claim 1 wherein the energizing means magnetizes the intermediate members in a set at spaced times in a sequence which first magnetizes the intermediate members furthest from their respective stationary member to minimize the mass moved by magnetic attraction in the initial stages of movement in each direction.

13. The apparatus of claim 12 wherein the energizing means, to conserve energy, deactivates at least some of the members in a set after their respective gaps have been closed and before other gaps in their respective set of members have been closed.

14. The apparatus of claim 12 wherein both sets of members are aligned on a common longitudinal axis, said driven member being a reciprocating shaft which lies parallel to said axis and extends through said members.

15. Apparatus for producing movement of a driven body, comprising a set of aligned paramagnetic members, comprising,
   two stationary paramagnetic members,
   a driven paramagnetic member located between the stationary paramagnetic members and connected to the driven body,
   a first movable intermediate paramagnetic member located between one of the stationary paramagnetic members and the driven paramagnetic member, a second movable intermediate paramagnetic member located between the other stationary paramagnetic member and the driven paramagnetic member, said first and second intermediate paramagnetic members being on opposite sides of said driven paramagnetic member, energizing means being operable in a first mode to create magnetic attraction between the first intermediate member, the driven member and the first stationary member to move the driven member in a first direction; said energizing means being operable in a second mode to create magnetic attraction between the second intermediate member, the driven member and the second stationary member to move the driven member in said second direction which is opposite to said first direction, and means for repeatedly shifting said energizing means between the first mode and the second mode to move the driven member alternately in the first and second directions.

* * * * *